April 10, 1945.  E. W. DALY  2,373,171
AUTOMATIC CREAM EXPENDER
Filed March 10, 1942
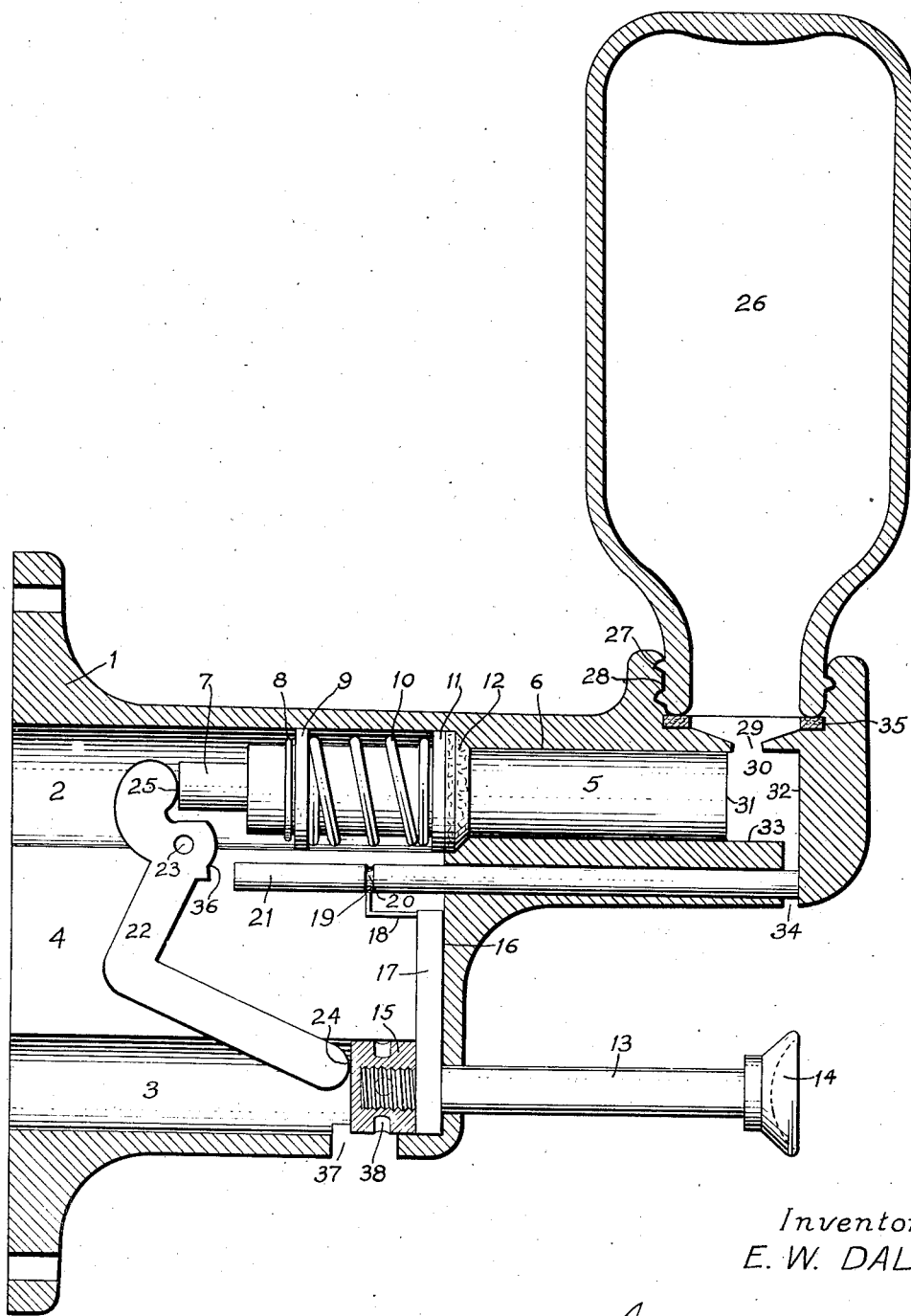
Inventor
E. W. DALY
By [signature]
Attorney Patented Apr. 10, 1945

2,373,171

UNITED STATES PATENT OFFICE 2,373,171

AUTOMATIC CREAM EXPENDER

Edric W. Daly, Santiago, Chile

Application March 10, 1942, Serial No. 434,141
In Chile May 7, 1941

10 Claims. (Cl. 222—127)

This invention relates to devices for the gradual extraction of semi-fluid creams and other substances from their containers. It has for its principal object the manufacture of an apparatus of this kind whereby a predetermined quantity, of semi-fluid dental cream for example, may be drawn from its container and deposited on a tooth brush whilst being expelled automatically through an orifice, on the application of pressure from the brush or other article on a push rod of said apparatus.

Up to the present various contrivances have been devised for the gradual extraction of such semi-fluid substances from their containers, in order that waste and pollution may be prevented, such as those for the extraction of fluid soap, but the quantity of fluid drawn from them is irregular, and they require considerable handling in service and for re-filling. Compressible tube containers are also wasteful besides being useless when emptied.

These drawbacks are obviated with the use of the apparatus of the present invention, which will be described hereinbelow in connection with the accompanying drawing, which shows an embodiment of the device specially suitable for the supply of graduated portions of semi-liquid dentifrice directly on the tooth brush.

In the figure, which illustrates a vertical longitudinal section of the apparatus, 1 is a metal casing provided with two parallel cylindrical cavities 2 and 3 connected by a vertical slot 4. Concentric with cavity 2 there is a cylinder 6 in which is adjusted a plunger 5 which projects into said cavity. This plunger has a short stem 7 and a flange 8 on which rests a washer 9 whereby a spiral spring 10 may be compressed against another washer 11 which rests against a conical felt washer 12. A rod 13 provided at one end with a cupped knob 14 penetrates into the lower part of the casing and has its other end threaded for screwing thereon a length-adjusting nut 15 provided with adjusting pin holes 38. Fixed to the rod 13 in the proximity of nut 15 and between this nut and the casing wall 16 there is a rectangular vertical member 17 having at its upper end an angular flat spring 18 with a free end 19 which fits into an annular notch 20 of a rod 21. 22 is a lever pivoted at 23 having a lower arm with a cylindrical end 24 which is kept in contact with the adjustable nut 15, and an upper arm with cylindrical end 25 which is kept in contact with the end of the stem 7 of plunger 5 by the expansion of spring 10. Lever 22 is also provided with a projection 36 for limiting the displacement of rod 21 towards the left. On the upper side of the front end of the apparatus is screwed or otherwise attached a container 26, shown in section, preferably made of glass but which may be made of metal or other suitable material and which in the diagram is provided with a threaded end 27, which is screwed on thread 28 of the casing. The cream in container 26 descends through aperture 29 and drops into a chamber 30 formed by the end surface 31 of plunger 5 the interior wall 32 of the casing and bottom 33 at the end of which there is an orifice 34. An airtight joint is formed between container 26 and its seat by means of a rubber washer 35.

In the adoption of this device for the supply of semi-liquid dental cream directly on a tooth brush, the end of the brush is placed in the hollow of the knob 14 and by a slight hand pressure, rod 13 is pushed into the casing and nut 15 pushes the end of lever 22 which in its turning around pivot 23 moves the end 25 which presses on the stem 7 of plunger 5 and spring 10 is thereby compressed and the plunger moves towards the right. At the same time the spring carrying member 17 is moved along with the motion of rod 13 and rod 21 is moved in the same direction by the angular spring 18 with its end 19 lodged in notch 20 of rod 21. When the end of rod 21 has reached the projection 36 of lever 22 its motion is stopped and end 19 of spring 18 leaves the notch 20 and reaches a position beyond the end of rod 21. Plunger 5 during its forward motion closes the aperture 29 and displaces the fluid in chamber 30 ejecting it through aperture 34 which has been opened with the motion of rod 21 and the required amount of liquid drops on the brush below, which is pressing knob 14. Member 17, rod 21 and plunger 5 have their motion combined so that aperture 34 is automatically closed when plunger 5 starts to open aperture 29 during its return motion. The capacity of chamber 30 is regulated by means of nut 15 which is adjusted by turning pins in pinholes 38 through the casing opening 37. On the withdrawal of the brush spring 10 is released and it moves plunger 5 to the left (in the figure) the plunger pushes end 25 of lever 22 and end 24 of this lever moves to the right making rod 13 return to its original position. In the meantime member 17 and angular spring 18 move along with rod 13 in its return motion and this spring carries rod 21 to its original position thereby closing aperture 34. As spring 18 continues its motion towards the right, the spring end 19 will finally engage again in notch 20. The initial return motion of plunger 5 will produce a suction of air through the orifice 34, and this air later ascends to the upper end of container 26 when aperture 29 is uncovered, and in this manner the formation of a vacuum within the container is prevented whilst the cream descends into chamber 30, and thus this chamber will be easily filled again and the operation may be repeated. The suction formed by the return motion of the plunger also serves to cut off sharply the supply of cream and draw in any particle which may have remained in orifice 34 after the discharge of the dentifrice on the brush.

It will be seen that the apparatus of the present invention offers important advantages over previously known devices for the hygenic and economical consumption of dentifrices or other creams. The container may be of large size, and made of glass or metal containing a supply which permits economizing say, a large number of compressible tubes or containers which when emptied are useless and their value lost. Also, the delivery orifice of the apparatus is not put into contact with the brush, and absolutely hygenic conditions of supply are ensured. Furthermore, as the supply can be regulated, losses and excessive consumption are prevented.

Devices of similar construction may be used for the supply of liquid soap, creams or other semi-liquid materials where graduated quantities of them are required, in which cases suitable push bars or handles may be substituted for the push knob of the present embodiment.

I claim:

1. Apparatus for the automatic supply of graduated quantities of semi-liquid materials, comprising a casing, a chamber therein having a discharge orifice for receiving and dispensing a predetermined quantity of material, means for feeding material to the chamber, means for controlling the discharge of material from the chamber, means for forcing material from the chamber when the discharge control means is in open position and acting to prevent material entering the chamber during discharge, and dual means operatively connected with the discharge control means and the forcing means for simultaneously moving the control means in one direction to open position and for moving the forcing means in an opposite direction to dispense the predetermined quantity of material from the chamber.

2. Apparatus for the automatic supply of graduated quantities of semi-liquid materials, comprising a casing, a chamber therein having a discharge orifice for receiving and dispensing a predetermined quantity of material, means for feeding material to the chamber, means for controlling the discharge of material from the chamber, means for forcing material from the chamber when the control means is in open position and acting to prevent material entering the chamber during discharge, dual means operatively connected with the control means and the forcing means for simultaneously moving the control means in one direction to open position and for moving the forcing means in an opposite direction to dispense the predetermined quantity of material from the chamber, and spring means associated with the forcing means for returning the forcing means, control means and operating means to their normal positions on release of the operating means and withdrawing any material remaining in the discharge orifice of the chamber after discharge of the material from the chamber.

3. Apparatus as claimed in claim 1 in which the operating means and its operating connection includes a push rod, a stop member fixed thereon, a spring pawl carried by the stop member and releasably engageable with the discharge control means, and a bell crank lever pivotally mounted within the casing, one angle arm of which contacts the push rod while the other contacts the forcing means in the form of a plunger, and said bell crank lever having an abutment constituting a stop for limiting the retracting movement of the discharge control means and thereby effecting temporary disengagement of the pawl therefrom.

4. Apparatus as claimed in claim 2 in which the operating means and its operating connection includes a push rod, a stop member fixed thereon, a spring pawl carried by the stop member and releasably engageable with the discharge control means, and a bell crank lever pivotally mounted within the casing, one angle arm of which contacts the push rod while the other contacts the forcing means in the form of a plunger, and said bell crank lever having an abutment constituting a stop for limiting the retracting movement of the discharge control means and thereby effecting temporary disengagement of the pawl therefrom.

5. Apparatus as claimed in claim 1, in which means are provided on the dual operating means and in its operative connection with the forcing means for regulating the stroke of the latter and consequently varying the capacity of the chamber.

6. Apparatus for the automatic supply of graduated quantities of semi-liquid materials, comprising a hollow casing having an extension at the upper end provided with a cylinder communicating with the interior of the casing, means on the upper part of the extension in communication with the outer end of the cylinder for removably supporting a container in an inverted position, a chamber at the outer end of the cylinder in communication with the container supporting means and provided with an outlet passage in the bottom, a normally retractable spring pressed plunger in the cylinder, the forward end of which constitutes a wall for the chamber and position normally to allow material to pass from the container to the outlet, a reciprocable rod valve in the extension for normally closing the outlet passage, an operating push rod slidably mounted in the lower end of the casing adapted to be moved inwardly when a toothbrush is pressed thereagainst and having operable connection with the valve rod and the plunger to simultaneously move the same in opposite directions in order that the plunger will move into the chamber to close the inlet and force material through the outlet passage onto the brush.

7. Apparatus for the automatic supply of graduated quantities of semi-liquid materials, comprising a hollow casing having an extension at the upper end, a chamber in said extension, means on the upper part of the extension for detachably supporting a material container in an inverted position and having communication with the chamber, an outlet passage leading from the bottom of the chamber, a cylinder provided in the extension in communication with the chamber and with the interior of the casing, a normally retracted spring pressed plunger in the cylinder, a reciprocating valve rod in the casing and the extension and normally closing the outlet passage, a push rod mounted in the casing and normally arranged in an extended position beneath the outlet passage, a spring controlled releasable latch carried with the push rod and releasably engageable with the valve rod for effecting movement of the latter into open position on operation of the push rod, and a bell crank lever pivotally mounted within the casing and having its respective angle portions engaging the inner end of the plunger and the outer end of the push rod whereby an inward movement of the push rod effects an opening movement of the valve rod while the plunger is simultaneously moved into the chamber to force the predetermined supply through the outlet passage.

8. Apparatus as claimed in claim 7, in which adjusting means are attached to the inner end of the push rod at its point of engagement with the bell crank lever for regulating the stroke of the plunger and consequently the capacity of said chamber.

9. Apparatus as claimed in claim 7, in which an abutment is provided on the bell crank lever adjacent its point of fulcrum to serve as a stop for limiting the opening movement of the valve rod and for effecting disconnection of the latch, said valve rod having a groove for receiving the latch which receives the latch on return movement of the push rod.

10. Apparatus as claimed in claim 7, in which a spring is provided about the plunger and is tensioned so that on release of the push rod the latter is moved into its normally extended position, and a stop on the push rod for limiting the outward movement thereof, said stop acting to support the releasable latch.

EDRIC W. DALY.